(12) United States Patent
Clark et al.

(10) Patent No.: US 7,836,039 B2
(45) Date of Patent: Nov. 16, 2010

(54) SEARCHING DESCENDANT PAGES FOR PERSISTENT KEYWORDS

(75) Inventors: Timothy Pressler Clark, Rochester, MN (US); Zachary Adam Garbow, Rochester, MN (US); Richard Michael Theis, Sauk Rapids, MN (US); Brian Paul Wallenfelt, Eden Prairie, MN (US)

(73) Assignee: International Business Machines Corporation, Armonk, NY (US)

(*) Notice: Subject to any disclaimer, the term of this patent is extended or adjusted under 35 U.S.C. 154(b) by 319 days.

(21) Appl. No.: 11/609,698

(22) Filed: Dec. 12, 2006

(65) Prior Publication Data

US 2008/0140606 A1 Jun. 12, 2008

(51) Int. Cl.
*G06F 7/00* (2006.01)
(52) U.S. Cl. ...................... 707/706; 707/707
(58) Field of Classification Search .......... 707/1–10, 707/706, 707, 999.001, 999.002, 999.003, 707/999.004, 999.005, 999.006, 999.007, 707/999.008, 999.009, 999.01
See application file for complete search history.

(56) References Cited

U.S. PATENT DOCUMENTS

| 6,038,561 | A | * | 3/2000 | Snyder et al. ........... 707/1 |
| 6,122,647 | A | | 9/2000 | Horowitz et al. |
| 6,438,539 | B1 | * | 8/2002 | Korolev et al. ........... 707/1 |
| 6,490,577 | B1 | * | 12/2002 | Anwar ................... 707/1 |
| 6,585,776 | B1 | | 7/2003 | Bates et al. |
| 2002/0078014 | A1 | | 6/2002 | Pallmann |
| 2002/0099685 | A1 | * | 7/2002 | Takano et al. ........... 707/1 |
| 2002/0143932 | A1 | * | 10/2002 | Quintero et al. ......... 709/224 |
| 2004/0243628 | A1 | | 12/2004 | Patrick |
| 2004/0267739 | A1 | | 12/2004 | Dowling |
| 2007/0282828 | A1 | * | 12/2007 | Ikenoue .................. 707/5 |
| 2008/0115047 | A1 | | 5/2008 | Petri |

* cited by examiner

*Primary Examiner*—Mohammad Ali
*Assistant Examiner*—John P Hocker
(74) *Attorney, Agent, or Firm*—Owen J. Gamon

(57) ABSTRACT

A request is received that includes a primary keyword and a persistent keyword. In response to the request, a root page is found that includes a first term that matches the primary keyword. Descendant pages of the root page are searched for a second term that matches the persistent keyword. The search determines that the descendant pages are at levels on paths from the root page and that the levels are within a depth from the root page. A descendant page is found that is a descendant of the root page and that includes a second term that matches the persistent keyword. A root link that points at the root page and a descendant link that points at the descendant page are sent to the requester. If the number of times that the primary keyword was received is greater than a threshold number, then the primary keyword is added to the persistent keywords.

3 Claims, 11 Drawing Sheets

SEARCHING DESCENDANT PAGES FOR PERSISTENT KEYWORDS

CROSS-REFERENCE TO RELATED APPLICATION

The present application is related to commonly-assigned patent application Ser. No. 11/566,996, to Timothy P. Clark, et al., filed Dec. 5, 2006, entitled "Searching Descendant Pages of a Root Page for Keywords," which is herein incorporated by reference.

FIELD

An embodiment of the invention generally relates to searching linked pages of information that are stored in computer systems and more specifically relates to searching descendant pages of a root page for persistent keywords.

BACKGROUND

Years ago, computers were isolated devices that did not communicate with each other. But, today computers are often connected in networks, such as the Internet or World Wide Web, and a user at one computer, often called a client, may wish to access information at multiple other computers, often called servers, via a network. Information is often stored at servers and sent to the clients in units of pages, which are connected together via embedded hyperlinks or links. A link is an address, such as a URL (Uniform Resource Locator) of a linked page that is embedded in a linking page that, when selected, causes the linked page to be retrieved. Because the Internet includes so many pages, finding a page of interest can be difficult, so several companies provide search engines that allow users to search for pages that contain keywords.

Current search engines have strong technology in the area of searching the Internet in general for a combination of keywords and can usually find pages that are close to the desired results and related to the keywords. But, often the found pages are too general and are not the specific page that the user desires. Instead, the specific page is often linked (directly or indirectly) from one of found pages. Unfortunately, the found pages often contain many links and following all of them is tedious and time consuming.

In an attempt to address these problems, some sites provide their own search functions that allow users to search that particular site for a keyword. But, these search functions are only helpful if the page of interest is stored at that site. If the page of interest is not present at the site, but is instead linked from that site, the search function will not find it.

As another technique, some browsers will search the sites identified in their history caches of sites previously visited. This technique can be successful if the user is at the same computer using the same browser as when the page was previously viewed and if the page has not already been purged from the history cache. But, users are increasingly mobile and may use a variety of computers and browsers, and users are concerned with privacy, so they often erase the history cache, so this technique is of limited usefulness.

Thus, what is needed is an enhanced technique for finding pages that are linked, either directly or indirectly, from other pages.

SUMMARY

A method, apparatus, system, and signal-bearing medium are provided. A request is received that includes a primary keyword and a profile that includes a persistent keyword. In response to the request, a root page is found that includes a first term that matches the primary keyword. Descendant pages of the root page are searched for a second term that matches the persistent keyword. The search determines that the descendant pages are at levels on paths from the root page and that the levels are within a depth from the root page. A descendant page is found that is a descendant of the root page and that includes the second term that matches the persistent keyword. A root link that points at the root page and a descendant link that points at the descendant page are sent to the requester. If the number of times that the primary keyword was submitted is greater than a threshold number, then the primary keyword is added to the persistent keywords. In this way, in an embodiment, persistent searches are enabled that allow a user to find pages linked on paths from a root page that include persistent keywords in which the user has a persistent interest.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

Figure 1:
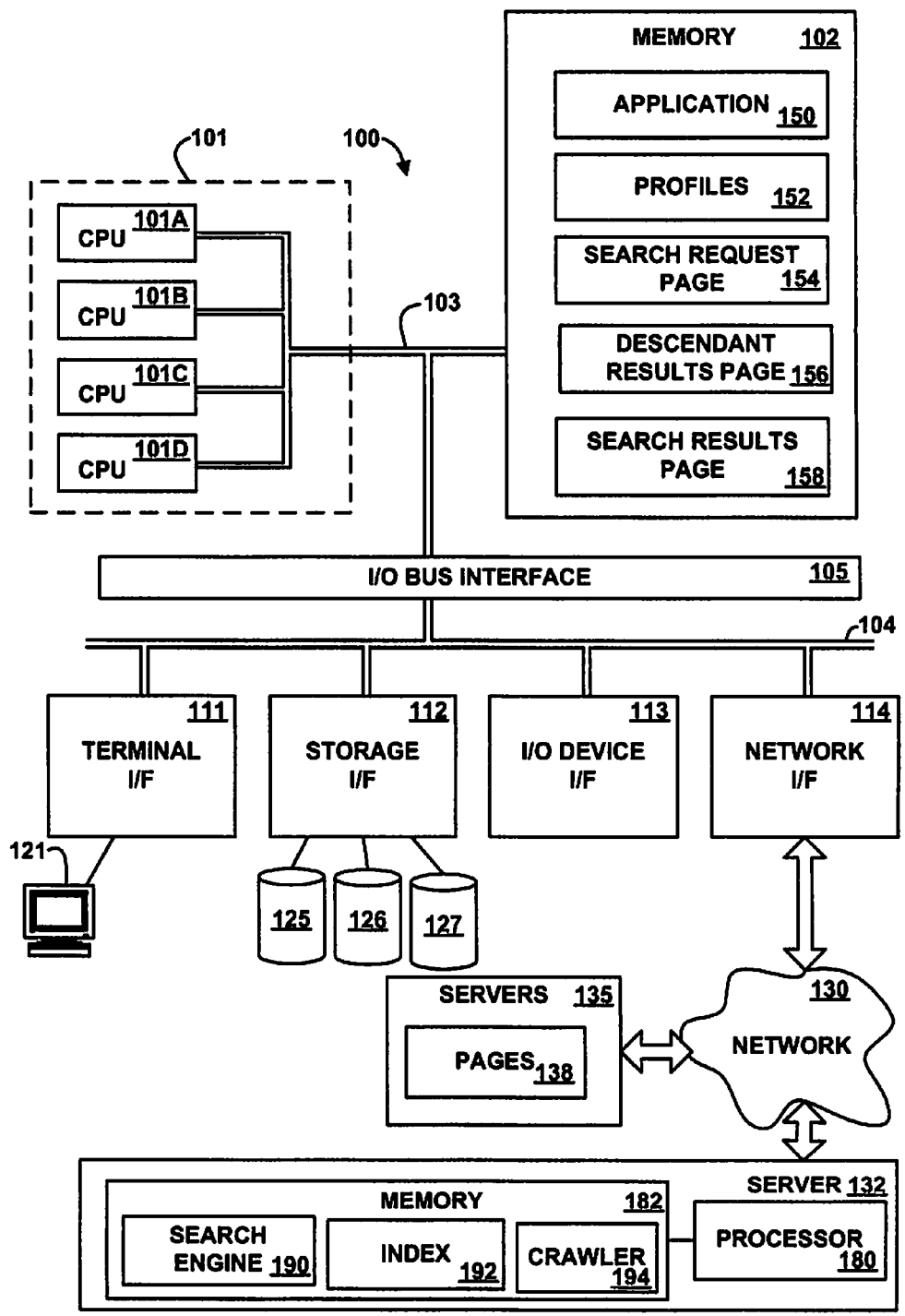
FIG. 1 depicts a high-level block diagram of an example system for implementing an embodiment of the invention.

Referring to the Drawings, wherein like numbers denote like parts throughout the several views, FIG. 1 depicts a high-level block diagram representation of a client computer system 100 connected to server computer systems 132 and 135 via a network 130, according to an embodiment of the present invention. The terms "client" and "server" are used herein for convenience only, and in various embodiments a computer system that operates as a client in one environment may operate as a server in another environment, and vice versa. In an embodiment, the hardware components of the computer systems 100, 132, and 135 may be implemented by IBM System i5 computer systems available from International Business Machines Corporation of Armonk, N.Y. But, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes an application 150, profiles 152, a search request page 154, a descendant results page 156, and a search results page 158. Although the application 150, the profiles 152, the search request page 154, the descendant results page 156, and the search results page 158 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the application 150, the profiles 152, the search request page 154, the descendant results page 156, and the search results page 158 are illustrated as being contained within the main memory 102, these elements are not necessarily all completely contained in the same storage device at the same time. Further, although the application 150, the profiles 152, the search request page 154, the descendant results page 156, and the search results page 158 are illustrated as being separate entities, in other embodiments some of them, portions of some of them, or all of them may be packaged together.

The application 150 provides an interface for storing data to the profiles 152. The application 150 further receives the search request page 154 from the server 132, presents or displays the search request page 154, receives data for a search request and sends the search request page 154 and the profile 152 to the search engine 190. The application 150 further receives the descendant results page 156 and the search results page 158 and renders and displays them. The application 150 further receives selected pages from the servers 135 via links that point at the pages.

In various embodiments, the application 150 may be implemented via an operating system, a user application, a third-party application, a browser, a plug-in for a browser, any combination thereof, or any appropriate program encoded with executable instructions or interpretable statements for execution on the processor 101. In another embodiment, the application 150 may implemented in hardware. Since, as explained above, the application 150 may include a combination of components, one component (e.g., the browser) may perform one action, such as retrieval of pages, while another component (e.g., the plug-in) sends requests for searches to the search engine 190.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interface) bus, or any other appropriate bus technology.

The I/O interface units support communication with a variety of storage and I/O devices. For example, the terminal interface unit 111 supports the attachment of one or more user terminals 121, which may include user output devices (such as a video display device or speaker) and user input devices (such as a keyboard, mouse, or other pointing device). The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O device interface 113 provides an interface to any of various other input/output devices or devices of other types, such as printers or fax machines. The network interface 114 provides one or more communications paths from the computer system 100 to other digital devices and computer systems 132 and 135; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user "mainframe" computer system, a single-user system, or a server or similar device that has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100, the server computer systems 132, and the server computer systems 135. In various embodiments, the network 130 may represent a storage device or a combination of storage devices, either connected directly or indirectly to the computer system 100. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The server computer system 132 may include some or all of the hardware components previously described above as being included in the client computer system 100. The server computer system 132 includes memory 182 connected to a processor 180. The memory 182 is a random access semiconductor memory or other storage device that stores or encodes a search engine 190, an index 192, and a crawler 194.

The crawler 194 (also called a spider, robot, or agent) visits a page at the server 135, reads it, and then follows links to other pages within the same domain or web site. The crawler 194 typically returns to the site on a regular basis, such as every month or other time period, to look for changes. The crawler 194 stores selected information it finds in the index 192, which represents the pages at the server computer systems 135. The index 192 is further described below with reference to FIG. 6. Sometimes new pages or changes that the crawler 194 finds may take some time to be added to the index 192. Thus, a web page may have been "crawled" but not yet "indexed." Until the page has been added to the index 192, the page is not available to those searching with the search engine 190.

The search engine 190 sends the search request page 154 to the application 150, and in response, receives one or more search keywords and the profile 152, which includes one or more persistent keywords. In another embodiment, the search engine 190 may receive search keywords and the profile 152 even though the search engine 190 has not sent the search request page 154 to the application 150. The search engine 190 reads information about the pages that are described in the pre-created index 192 to find root pages that include terms that match the search keywords and also to find descendant pages of the root pages that include terms that match persistent keywords. The descendant pages that the search engine 190 finds are descendants of the root page at a level from the root page that is within a depth specified by the profile 152. The search engine 190 returns the search results page 158 and the descendant results page 156 to the application 150, which include links to the root pages and links to the descendant pages, respectively.

In an embodiment, the crawler 194 and/or the search engine 190 include instructions capable of executing on the processor 180 or statements capable of being interpreted by instructions executing on the processor 101 to perform the functions as further described below with reference to FIGS. 7, 8, 9, 10, and 11. In another embodiment, the crawler 194 and/or the search engine 190 may be implemented in microcode. In another embodiment, the crawler 194 and/or the search engine 190 may be implemented in hardware via logic gates and/or other appropriate hardware techniques.

The server computer systems 135 may include some or all of the hardware components previously described above as being included in the computer system 100. The server computer systems 135 include pages 138 stored in memory with a similar description as the main memory 102. The pages 138 may include any appropriate content that is capable of being crawled via the crawler 194 and retrieved via the application 150, such as text, video, audio, images, control tags, formatting tags, statements, or any other appropriate data. In various embodiments, the pages 138 may be implemented via documents, files, objects, tables, databases, directories, subdirectories, or any portion or combination thereof and in some embodiments may include embedded control tags, statements, or logic in addition to data. Examples of the pages 138 are further described below with reference to FIG. 2.

It should be understood that FIG. 1 is intended to depict the representative major components of the client computer system 100, the network 130, the server computer systems 132, and the server computer systems 135 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the client computer system 100 and/or the server computer system 132, and that, when read and executed by one or more processors in the client computer system 100 and/or the server computer system 132, cause the client computer system 100 and/or the server computer system 132 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the client computer system 100 and/or the server computer system 132 via a variety of tangible signal-bearing media that may be operatively or communicatively connected (directly or indirectly) to the processor or processors, such as the processor 101 and 180. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), the main memory 102 or 182, CD-RW, or diskette; or (3) information conveyed to the client computer system 100 and/or the server computer system 132 by a communications medium, such as through a computer or a telephone network, e.g., the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
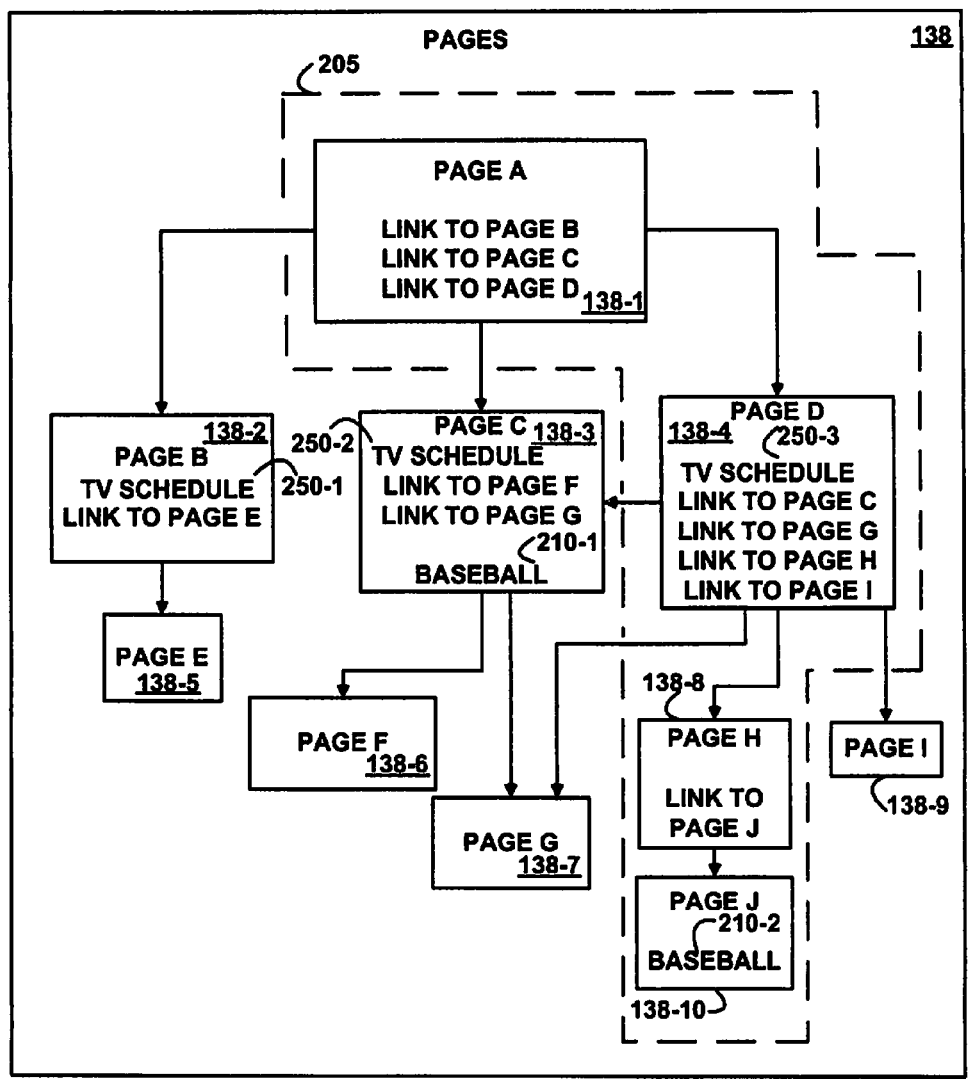
FIG. 2 depicts a block diagram of example pages, according to an embodiment of the invention.

FIG. 2 depicts a block diagram of example pages 138, according to an embodiment of the invention. The example pages 138 include pages 138-1, 138-2, 138-3, 138-4, 138-5, 138-6, 138-7, 138-8, 138-9, and 138-10, whose organization may be represented as a graph. The page 138 generically refers to the pages 138-1, 138-2, 138-3, 138-4, 138-5, 138-6, 138-7, 138-8, 138-9, and/or 138-10.

In general, a graph includes sets of node and edges. The nodes (also called vertices) represent objects or data, and the edges represent the links between the pages. An edge connects two nodes, and these two nodes are referred to as incident to that edge; equivalently, that edge is incident to those two nodes. The edges may have a direction, in which case the edges are called directed edges. If a direction of an edge is away from a first node and toward a second node, the first node is said to be the parent node of the second node, which is the child node of the first node.

One type of a graph is a tree, which represents a hierarchical organization of linked data. A tree takes its name from an analogy to trees in nature, which have a hierarchical organization of branches and leaves. For example, a leaf is connected to a small branch, which further is connected to a large branch, and all branches of the tree have a common starting point at the root. Analogously, in an embodiment where the graph is a tree, the nodes have a hierarchical organization, in that a node has a relationship with another node, which itself may have a further relationship with other nodes, and so on. Thus, all of the nodes can be divided up into sub-groups and groups that ultimately all have a relationship to a root node.

To define a tree more formally, a tree structure defines the hierarchical organization of nodes, which can represent any data. Hence, a tree is a finite set, T, of one or more of the nodes, such that a) one specially designated node is called the root of the tree; and b) the remaining nodes (excluding the root) are partitioned into m>=0 disjoint sets $T_1, \ldots T_m$, and each of these sets is in turn a tree.

The trees $T_1, \ldots, T_m$ are called the subtrees of the root. Thus, every node in a tree is the root of some subtree contained in the whole tree. The number of subtrees of a node is called the degree of that node. A node of degree zero is called a terminal node or a leaf. A non-terminal node is called a branch node. The level of a node with respect to T is defined by saying that the root has level 0, and other nodes have a level that is one higher than they have with respect to the subtree that contains them. Each root is the parent of the roots of its subtrees, and the latter are siblings, and they are also the children of their parent. The nodes in the subtrees of a root are the root's descendants. The root of the entire tree has no parent.

A different definition of a tree defines a tree as a connected acyclic simple graph. A simple graph has no multiple edges that share the same end nodes. An acyclic graph contains no cycles, where a cycle is a closed walk.

A walk is an alternating sequence of a subset of the nodes and edges of the graph, beginning with a first-node and ending with a last-node, in which each node in the walk is incident to the two edges that precede and follow it in the sequence, and the nodes that precede and follow an edge are the end-nodes of that edge. The walk is said to be closed if its first-node and last-node are the same or open if its first-node and last-node are different. An open walk is also called a path. In various embodiments, all of the edges in the walk may be different or distinct (in which case the walk is also known as a trail), or some of the edges in the walk may be the same. A walk may be formed from any type of the graph.

Thus, in the example of FIG. 2, the organization of the linked pages 138 may be represented by a graph, in which case the nodes may represent the pages, and each directed edge represents a link from one page to another page.

For example, the page 138-1 is the root page of the pages 138. The page 138-1 includes embedded links (child links) that point at its child pages 138-2, 138-3, and 138-4. The pages 138-2, 138-3, and 138-4 are descendants of their parent page, which is the root page 138-1. The page 138-2 includes an embedded child link that points at its child page 138-5. The page 138-5 is a descendant of its parent page 138-2 and of the page 138-1.

The page 138-3 includes embedded child links that point to its child pages 138-6 and 138-7. The pages 138-6 and 138-7 are descendants of their parent page 138-3 and of the page 138-1. The page 138-4 includes embedded child links that point to its child pages 138-3, 138-7, 138-8, and 138-9. The pages 138-3, 138-7, 138-8, and 138-9 are descendants of their parent page 138-4 and of the page 138-1. The page 138-8 includes an embedded child link that points at its child page 138-10. The page 138-10 is a descendant of its parent page 138-8, the page 138-4, and of the page 138-1.

The pages 138-3 and 138-10 include the respective terms 210-1 and 210-2. The pages 138-2, 138-3, and 138-4 include the respective terms 250-1, 250-2, and 250-3. Any, some, or all of the pages may also include additional terms.

The graph of the pages 138 includes an example path 205, which is a sequence of the page 138-1, the embedded child link from the page 138-1 to the page 138-4, the page 138-4, the embedded child link from the page 138-4 to the page 138-8, the page 138-8, the embedded child link from the page 138-8 to the page 138-10, and the page 138-10. The pages 138-4, 138-8, and 138-10 in the path 205 are descendant pages of the root page 138-1. The path 205 represents a way for a user that is viewing the page 138-1 to find the descendant page 138-10 that includes a term 210-2 that matches or is the same as a persistent keyword in a profile 152. The root page 138-1 is at level zero in the path 205. The page 138-4 is at level one in the path 205. The page 138-8 is at level two in the path 205. The page 138-10 is at level three in the path 205.

In various embodiments, a link is a partially or fully-qualified URL (Uniform Resource Locator) or other address that is embedded in one page and points at another page. A link may include any, some, or all of a specification of a communication protocol, a port identifier, an address on the network 130, a domain identifier, a specification of a hierarchy of directories and subdirectories, and a file name that identifies a file or page within the hierarchy of directories and subdirectories. A link may have associated text, such as a title, abstract, or description of the contents of the page at which the link points.

Figure 3:
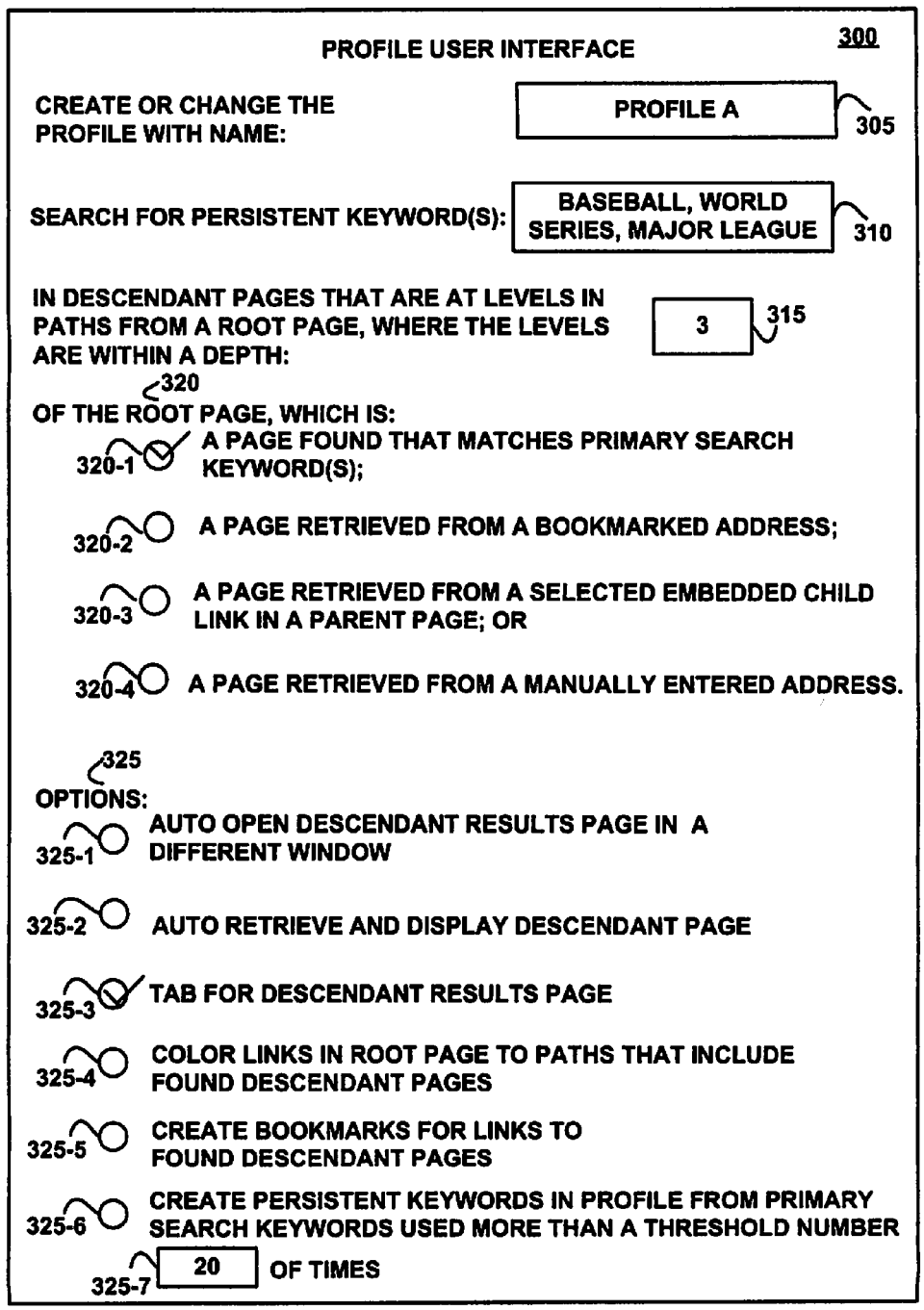
FIG. 3 depicts a block diagram of an example user interface for storing profile data, according to an embodiment of the invention.

FIG. 3 depicts a block diagram of an example user interface for storing profile data, according to an embodiment of the invention. The application 150 displays or presents the profile user interface 300 via the terminal 121, receives data via the input fields 305, 310, 315, 320, and/or 325 from the user via the terminal 121, and stores or amends the data to the profile 152 that is identified by the profile name 305.

The profile name 305 names or identifies one of the profiles 152. The persistent search keyword(s) 310 specify words or terms that the search engine 190 is to use to search descendant pages of a root page on paths from the root page. The depth 315 specifies a maximum number of levels that the descendant pages are within, on their paths from the root page. The descendant pages being with the depth 315 means that the descendant pages are at levels on their paths (from the root page) that are less than or equal to the depth 315.

The root page criteria 320 (which generically refers to the root page criteria 320-1, 320-2, 320-3, and 320-4) specifies one or more selection criteria that the search engine 190 uses to select the root page. The root page criteria 320-1 directs the search engine 190 to designate as a root page a page that the search engine 190 finds that contains terms that match primary search keywords specified by a search request. Primary search keywords are sent to the search engine 190 via the search user interface, as further described below with reference to FIG. 4.

The root page criteria 320-2 specifies that pages the application 150 retrieves in response to a selection of a bookmark are root pages. In response to selection of the root page criteria 320-2, the application 150 sends a link to a page retrieved via a bookmark to the search engine 190 and instructs the search engine 190 to search descendants of that root page for the persistent search keyword(s) 310, up to the depth 315 on paths from the root page.

The root page criteria 320-3 specifies that pages the application 150 retrieves in response to a selection of an embedded child link in a parent pages are root pages. In response to selection of the root page criteria 320-3 and to a selection of an embedded child link, the application 150 retrieves the page that that is pointed at by the child link and sends the child link to the search engine 190, instructing the search engine 190 to search descendants of that root page for the persistent search keyword(s) 310, up to the depth 315 on paths from the root page. As explained above, the root page criteria 320-3 specifies that the root page changes as links are selected and pages are retrieved, so the profile remains active and the persistent search keywords(s) 310 are used to search the descendants of various root pages, as the user navigates between pages.

The root page criteria 320-4 specifies that pages the application 150 retrieves in response to manual entry of a link or address, e.g., via text entry, are root pages. In response to selection of the root page criteria 320-4 and to manual text entry of a link, the application 150 retrieves the page that that is pointed at by the link and sends the link to the search engine 190, instructing the search engine 190 to search descendants of that page for the persistent search keyword(s) 310, up to the depth 315 on paths from the root page.

The options 325 provides the user with an opportunity select various options 325-1, 325-2, 325-3, 325-4, 325-5, 325-6, and/or 325-7 (to which the option 325 generically refers). The auto open option 325-1 specifies that the application 150 automatically opens and displays the descendant results page 156 in a different window from the search results page or the root page. The descendant results page 156 includes links to descendant pages that include terms that match the persistent search keyword(s) 310. The search results page 158 includes root links to root pages that include terms that match primary search keywords.

The auto retrieve option 325-2 instructs the application 150 to automatically retrieve and display the descendant pages that the search engine 190 finds that include terms that match the persistent search keyword(s) 310. The tab option 325-3 instructs the application 150 to display a tab, and in response to selection of the tab, display the descendant result page 136 that includes links to the descendant pages that include terms that match the persistent search keyword(s) 310. The color option 325-4 instructs the application 150 to highlight or display with a specified color those links embedded in a root page or search results page that point at paths that include the descendant pages that the search engine 190 finds that include terms that match the persistent search keyword(s) 310. A link points at a path by pointing at a page that is in the path. The create bookmarks option 325-5 instructs the application 150 to add to a bookmark list the descendant pages that the search engine 190 finds that include terms that match the persistent search keyword(s) 310.

The create persistent keywords option 325-6 instructs the application 150 to add those primary search keywords that the user has specified (via the search interface of FIG. 4) more than a threshold 325-7 number of times, into the persistent search keyword(s) 310 in the profile 152. In this way, primary search keywords that a user searches for frequently (more than the threshold 325-7 number of times) become persistent search keyword(s) 310, even if not specified explicitly via the profile user interface 300.

Figure 4:
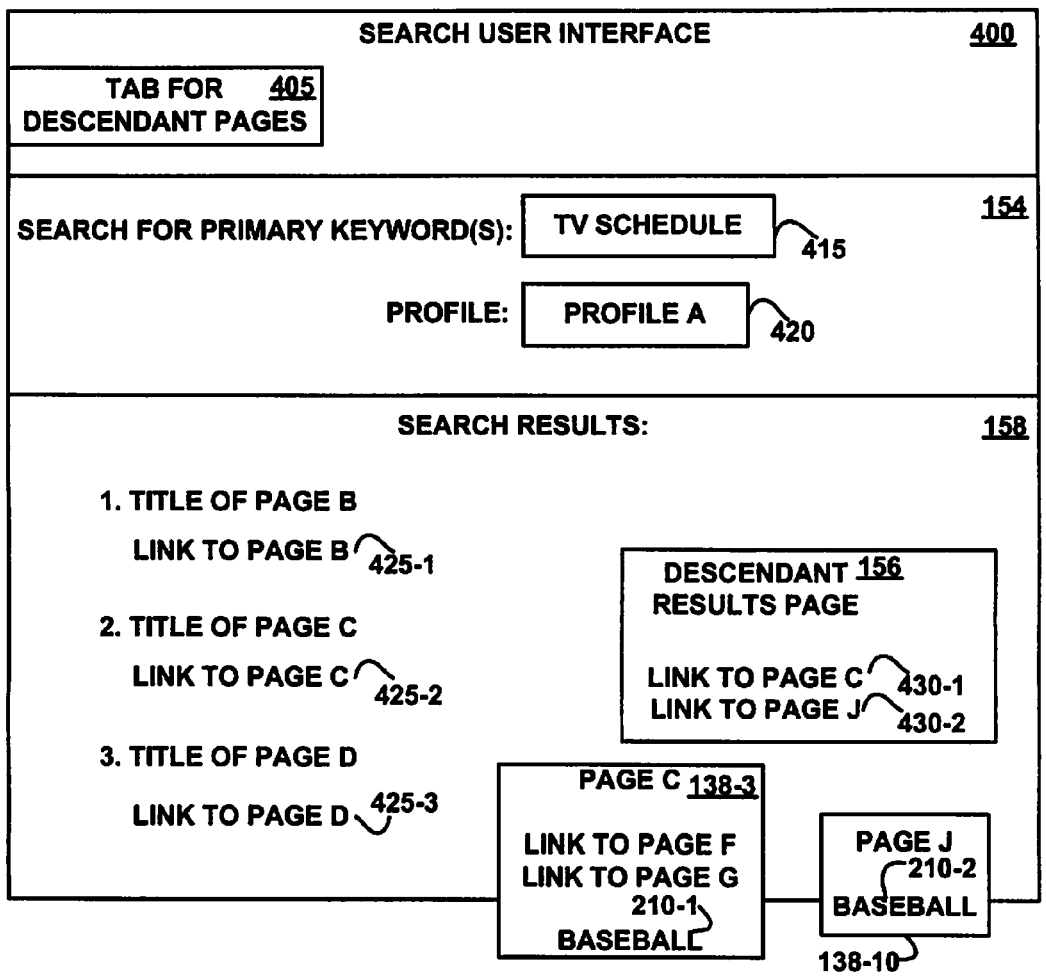
FIG. 4 depicts a block diagram of an example user interface for searches, according to an embodiment of the invention.

FIG. 4 depicts a block diagram of an example search user interface 400, according to an embodiment of the invention. The application 150 displays the search user interface 400 via the terminal 121. The search user interface 400 includes a tab 405, a search request page 154, and a search results page 158. FIG. 4 further includes a descendant results page 156 and descendant pages 138-3 and 138-10.

The application 150 retrieves the search request page 154 from the search engine 190, e.g., by retrieving requesting a page at a domain of the search engine 190 via a link. The search request page 154 includes a primary search keyword field 415 and a profile name field 420. The primary keyword field 415 allows the user to input a primary search keyword or keywords via the terminal 121. The profile name field 420 allows the user to specify the name or other identifier of a profile 152. The application 150 sends the input primary search keyword(s) 415 and the profile 152 designated by the profile name 420 to the search engine 190.

The search engine 190 searches for pages 138 that include terms that match the primary keywords 415 and sends the search results page 158 to the application 150, which renders and displays the search results page 158, as illustrated in FIG. 4. The search results page 158 includes root links 425-1, 425-2, and 425-3, which point at pages that include the terms that match the primary search keywords 415. The root links 425-1, 425-2, and 425-3 point at paths, and the search engine 190 searches the paths for descendant pages that include terms 210-1 and 210-2 that match persistent search keyword(s) 310 that are specified in the profile 152 identified by the profile name 420. The search engine 190 searches for descendant pages that are at levels in the paths that are less than or equal to the depth 315 specified by the profile 152 that is identified by the profile name 420. (For example, the page 138-3 is at level one on its path from its root page 138-1, and the page 138-10 is at level three on its path from its root page 138-1, and both one and three are less than or equal to three, which is the example value of the depth 315, as illustrated in FIG. 3.) The search engine 190 finds the descendant pages at levels within the depth 315 on the paths from the root page, stores descendant links (e.g., the descendant links 430-1 and 430-2) that point at those descendant pages into the descendant results page 156, and sends the descendant results page 156 to the application 150.

If option 325-1 is specified in the profile 152 identified by the profile name 420, then the application 150 displays the descendant results page 156 in a different window from the search results page 158, as illustrated in FIG. 4. If the option 325-2 is specified in the profile 152 identified by the profile name 420, then the application 150 retrieves the descendant pages 138-3 and 138-10 from the server computer systems 135 via the descendant links 430-1 and 430-2 found the descendant results page 156 and displays the pages 138-3 and 138-10 via the terminal 121. If the option 325-3 is specified in the profile 152 identified by the profile name 420, then the application 150 associates the descendant results page 156 with the tab 405 and displays the descendant results page 156 in response to selection of the tab 405. The tab may be selected by a user, e.g., via a keyboard, mouse, voice command, or other selection technique using the terminal 121.

If the option 325-4 is specified in the profile 152 identified by the profile name 420, then the application 150 highlights or colors the root links (displays the links with a color) in the search results page 158 that point at the path(s) that include the descendant pages. For example, the root link 425-2 in the search results page 158 points at the path that includes the descendant page 138-3, so the application 150 highlights or colors the root link 425-2. As another example, the root link 425-3 in the search results page 158 points at the path that includes the descendant page 138-10, so the application 150 highlights or colors the root link 425-3. The root link 425-3 points at the path that includes the descendant page 138-10 because the root link 425-3 points at the page 138-4, which includes an embedded link that points at the page 138-8, which includes an embedded link that points at the page 138-10, as illustrated in FIG. 2.

If the option 325-5 is specified in the profile 152 identified by the profile name 420, then the application 150 adds the descendant links 430-1 and 430-2 to a list of bookmarks (bookmarks are further described below with reference to FIG. 5), so that the user may easily retrieve the found descendant pages 138-3 and 138-10 (at which the respective descendant links 430-1 and 430-2 point) in the future. If the option 325-6 is specified in the profile 152 identified by the profile name 420 and if the user has searched for the same primary search keyword by inputting the same keyword into the primary keywords 415 more than the threshold 325-7 number of times, then the application 150 stores the primary search keywords 415 into the persistent search keyword(s) 310 in the profile 152 identified by the profile name 420.

Figure 5:
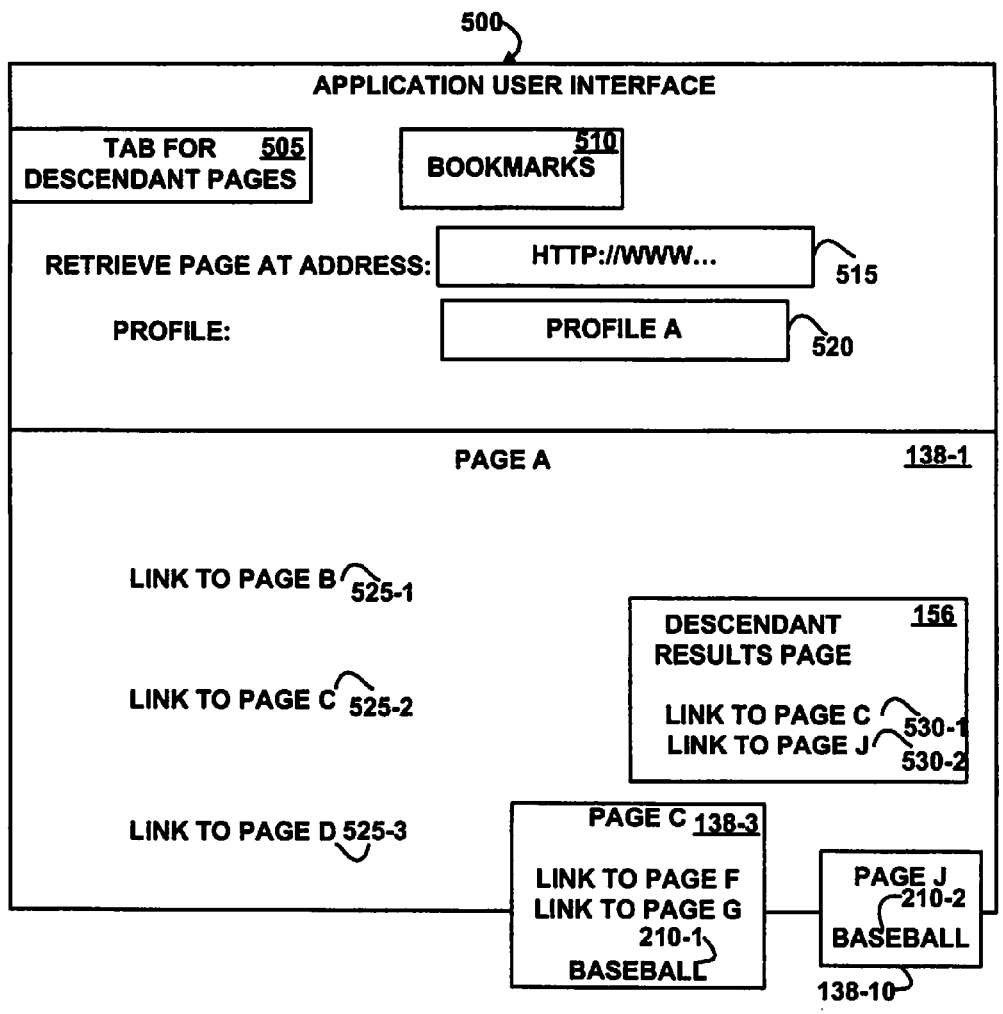
FIG. 5 depicts a block diagram of an example user interface for retrieving pages, according to an embodiment of the invention.

FIG. 5 depicts a block diagram of an example user interface 500 for retrieving a page via a link, according to an embodiment of the invention. The application 150 displays the application user interface 500 via the terminal 121. The application user interface 500 includes a tab 505, bookmarks 510, an input field for a root page link 515, an input field for a profile name 520, and a page 138-1. FIG. 5 further includes a descendant results page 156 and descendant pages 138-3 and 138-10.

The bookmarks 510 store a list of links to pages and associated titles, abstracts, or descriptions. The bookmarks 510 are a technique for the user to specify a page for the application 150 to retrieve from the server computer system 135. The profile name field 520 allows the user to specify the name or other identifier of a profile 152.

If the profile 152 identified by the profile name 520 specifies the root page criteria 320-2, then in response to a selection of a link in the bookmarks 510, the application 150 displays the bookmark link (the link to the root page) in the field 515 of the user interface 500, retrieves the root page 138-1 at which the bookmark link points, and renders and displays the root page 138-1 on the terminal 121. If the profile 152 identified by the profile name 520 specifies the root page criteria 320-4, then in response to manual user input of the link address 515, the application 150 retrieves the root page at which the link 515 points (the page 138-1 in this example) and renders and displays the page 138-1 on the terminal 121. The root page 138-1 includes embedded child links 525-1, 525-2, and 525-3 that point at its child pages 138-2, 138-3, and 138-4, as previously described above with reference to FIG. 2.

Also in response to the specification of the link 515 and the profile name 520, the search engine 190 further submits a search request to the search engine 190 that requests the search engine 190 to search for the persistent search keyword(s) 310 that are included in descendant pages that are at levels in paths from the root page 138-1 (the page at which the link 515 points, whether entered via manual text entry or a bookmark), where the levels are within (less than or equal to) the depth 315 from the root page 138-1.

The search engine 190 receives the search request with the profile and link to a root page 138-1, and in response performs the requested search for the persistent search keyword(s) 310 that are included in descendant pages that are at levels in paths from the root page 138-1, where the levels are within (less than or equal to) the depth 315 from the root page 138-1. The search engine 190 finds the descendant pages 138-3 and 138-10 at levels within the depth 315 on the paths from the root pages, stores the descendant links 530-1 and 530-2 that point at those descendant pages into the descendant results page 156, and sends the descendant results page 156 to the application 150. (For example, the page 138-3 is at level 1 on its path from its root page 138-1, and the page 138-10 is at level 3 on its path from its root page 138-1, and both 1 and 3 are less than or equal to 3, which the depth 315.)

If option 325-1 is specified in the profile 152 identified by the profile name 520, then the application 150 displays the descendant results page 156 in a different window from the retrieved root page 138-1. If the option 325-2 is specified in the profile 152 identified by the profile name 520, then the application 150 retrieves the descendant pages 138-3 and 138-10 via the descendant links 530-1 and 530-2 found in the descendant results page 156 and displays the descendant pages 138-3 and 138-10 via the terminal 121. If the option 325-3 is specified in the profile 152 identified by the profile name 520, then the application 150 associates the descendant results page 156 with the tab 505 and displays the descendant results page 156 if the tab 505 is selected, e.g., via a keyboard, mouse, voice command, or other selection technique at the terminal 121.

If the option 325-4 is specified in the profile 152 identified by the profile name 520, then the application 150 highlights or colors the links (displays the links with a color) in the root page 138-1 that points at the path(s) that include the descendant pages 138-3 and 138-10. For example, the link 525-2 in the root page 138-1 points at the path that includes the descendant page 138-3, so the application 150 highlights or colors the link 525-2. As another example, the link 525-3 in the root page 138-1 points at the path that includes the descendant page 138-10, so the application 150 highlights or colors the link 525-3. The link 525-3 points at the path that includes the descendant page 138-10 because the link 525-3 points at the page 138-4, which includes an embedded link that points at the page 138-8, which includes an embedded link that points at the page 138-10, as previously described above with reference to FIG. 2.

If the option 325-5 is specified in the profile 152 identified by the profile name 520, then the application 150 adds the descendant links 530-1 and 530-2 to the bookmarks 510, so that the user may easily retrieve the found descendant pages 138-3 and 138-10 (at which the respective descendant links 530-1 and 530-2 point) in the future.

Figure 6:
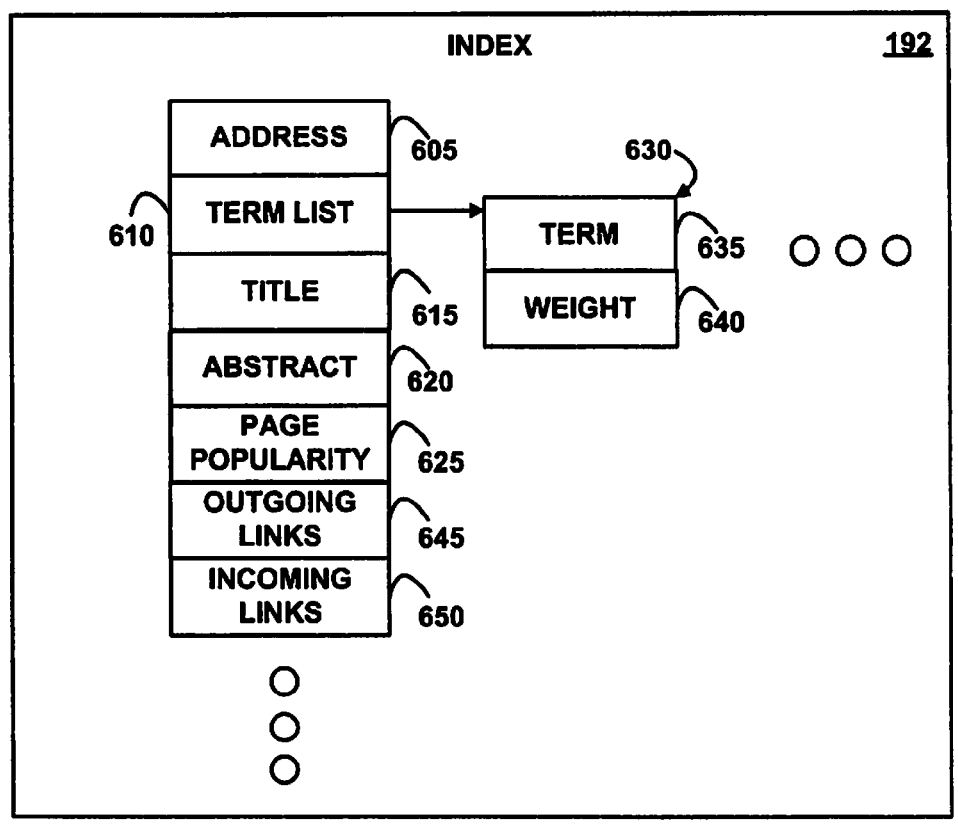
FIG. 6 depicts a block diagram of an example data structure for an index, according to an embodiment of the invention.

FIG. 6 depicts a block diagram of an example data structure for an index 192, according to an embodiment of the invention. The crawler 194 creates the index 192, as further described below with reference to FIG. 7. The index 192 includes an address 605, a term list 610, a title 615, an abstract 620, page popularity 625, outgoing links 645, and incoming links 650 for each page 138.

The address 605 includes the URL or other address of the page 138 at the servers 135. The term list 610 includes a list of term entries 630 for each term in the page 138 identified by the address 605. Each term entry 630 includes a term 635 and a term weight 640. The term 635 includes a word or collections of words in the page 138. The weight 640 indicates the relative weight, significance, or importance of the associated term 635, as compared to other terms 635 in the term list 610, which represent other words in the page identified by the address 605.

The crawler 194 may determine the weight 640 based on the location on the page (pointed to by the address 605) of the weight's associated term 635 and/or the frequency that the associated term 635 appears on the page 138. For example, the crawler 194 may assign a higher weight to terms that appear in a title or header because the crawler 194 assumes that terms in the title or header are more relevant or more important than terms appearing in other locations in the page. Further, the crawler 194 may also assign a higher weight to terms that appear near the top of the page, such as in the headline or in the first few paragraphs text because the crawler 194 assumes that any page relevant to the topic will mention those words at the beginning. Further, the crawler 194 may also assign a higher weight to terms that appear in a larger font size than terms that appear in a smaller font size because the crawler 194 assumes that terms displayed in a larger font are more important than terms displayed in a smaller font. The crawler 194 may also assign a higher weight to terms that appear in a meta tag. The crawler 194 may also analyze how often terms appear in relation to other words in the page and assign a higher weight to those terms 635 that appear more frequently.

The title 615 and the abstract 620 may be any text, audio, video, or image that describe the page at the associated address 605. In another embodiment, the index 192 may include any portion or all of the page pointed to by the address 605 The page popularity 625 indicates a relative importance of the page 138 at the address 605, as compared to other of the pages described by the index 192.

The outgoing links 645 specify the child links that are embedded in the page at the address 605 that point to the child pages of the page at the address 605. The incoming links 650 specify the parent page(s) of the page at the address 605 that include links that point at the page at the address 605.

Figure 7:
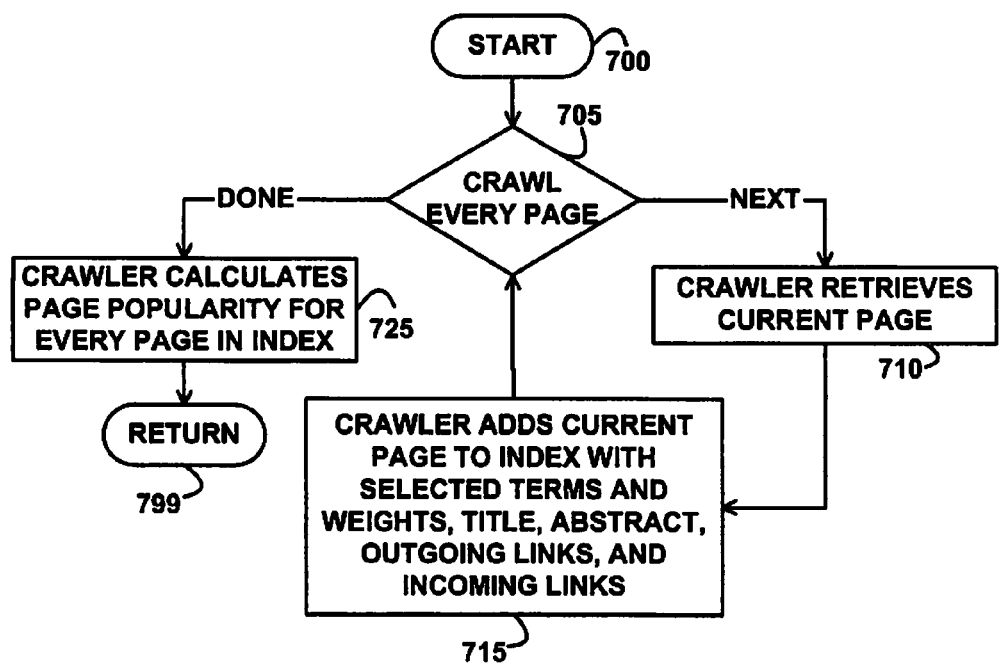
FIG. 7 depicts a flowchart of example processing for a crawler, according to an embodiment of the invention.

FIG. 7 depicts a flowchart of example processing for a crawler 194, according to an embodiment of the invention. The processing of FIG. 7 is performed periodically, so that the crawler 194 may crawl and process any pages 138 that have been added to the server computer systems 135 or modified since the last time that the crawler 194 crawled the pages 138.

Control begins at block 700. Control then continues to block 705 where the crawler 194 enters a loop that is executed once for each page 138. The crawler 194 may crawl all pages 138 or a subset of the pages 138. So long as more pages 138 remain to be crawled by the logic of FIG. 7, control continues from block 705 to block 710 where the crawler 194 retrieves the current page 138 from a server computer system 135.

Control then continues to block 715 where the crawler 194 adds the current page 138 to the index 192. Adding the current page 138 to the index 192 includes storing the address for the current page 138 in the address 605, selecting and storing the terms that exist in the current page 138 into the terms 635 of the index 192, calculating and storing the weights 640 for the selected terms in the index 192, and finding and storing the outgoing links 645 (embedded child links in the page) and the incoming links 650 to the page. In an embodiment, the crawler 194 follows the outgoing links 645 for the current page to the child pages at which the outgoing links 645 of the current page point, and sets the incoming links 650 for the child pages to indicate that the current page is an incoming link for the child pages. The crawler 194 may further select and store information from the page, such as the title 615, the abstract 620, or some or all of the page 138.

The crawler 194 may use any appropriate technique for selecting the terms 635 and the weights 640. For example, in an embodiment the crawler 194 may choose to ignore short, common words in the page 138 (e.g., "a," "and," and "the"), and not store these words in the terms 635. In an embodiment, the crawler 194 may select the weights 640 based on the location and/or frequency of the selected terms 635 in the current page 138. For example, the crawler 194 may assign higher weights 640 to those selected terms 635 that are in the title portion of the page 138 and assign lower weights 640 to those terms 635 that are at the bottom of the page 138. In an embodiment, the crawler 194 may assign higher weights 640 to those terms 635 that are used more frequently in the page 138 while assigning lower weights 640 to those terms 635 that are used less frequently in the page 138. In an embodiment, the crawler 194 may assign higher weights 640 to those terms 635 that have a larger font size in the page 138 while assigning lower weights 640 to those terms 635 that have a smaller font size in the page 138. In an embodiment, the crawler 194 may assign higher weights 640 to those terms 635 that are within meta tags while assigning lower weights 640 to those terms 635 that are not within meta tags in the page 138.

In various embodiments, the crawler 194 may find terms in the page 138 via closed caption tags, transcripts, and voice recognition techniques for analyzing audio or audio with video. But, in other embodiments, the crawler 194 may use any appropriate technique for selecting the terms from the page 138 to store in the terms 635 and for selecting the weights 640 for those terms 635.

Control then returns to block 705 where the crawler 194 determines whether another page still exists to be crawled, as previously described above.

If the crawler 194 has crawled every page 138 or every page in a subset of the pages 138, then control continues from block 705 to block 725 where the crawler 194 calculates the page popularities 625 for every page 138 in the index 192. In an embodiment, the crawler 194 may use either or both of on-the-page criteria or off-the-page criteria to determine the page popularities 625. On-the-page popularity criteria may include the relative weights 640 of the terms 635 in the various pages described by the index.

Off-the-page popularity criteria use data external to the page itself. An example of an off-the-page popularity criteria is link analysis, in which the crawler 194 analyzes how pages link to each other to determine the relative importance of the page with respect to other pages. For example, the crawler 194 may assign a higher page popularity 625 to a page with many incoming links 650 (a page to which many other pages link because such a page is probably an important page). In addition, the crawler 194 may use recursive page-popularity where the page popularity 625 of the pages that link to the linked-to page also factors into the popularity of the linked-to page. The page popularity 625 is a numeric value that represents how important the page is, as compared to all other pages described in the index 192. Page popularity 625 is based on the idea that when one page links to another page, it is effectively casting a vote for the other page. The more votes that are cast for a page, the more important the page. Also, in an embodiment, the importance of the page that is casting the vote determines how important the vote itself is.

Control then continues to block 799 where the logic of FIG. 7 returns.

Figure 8:
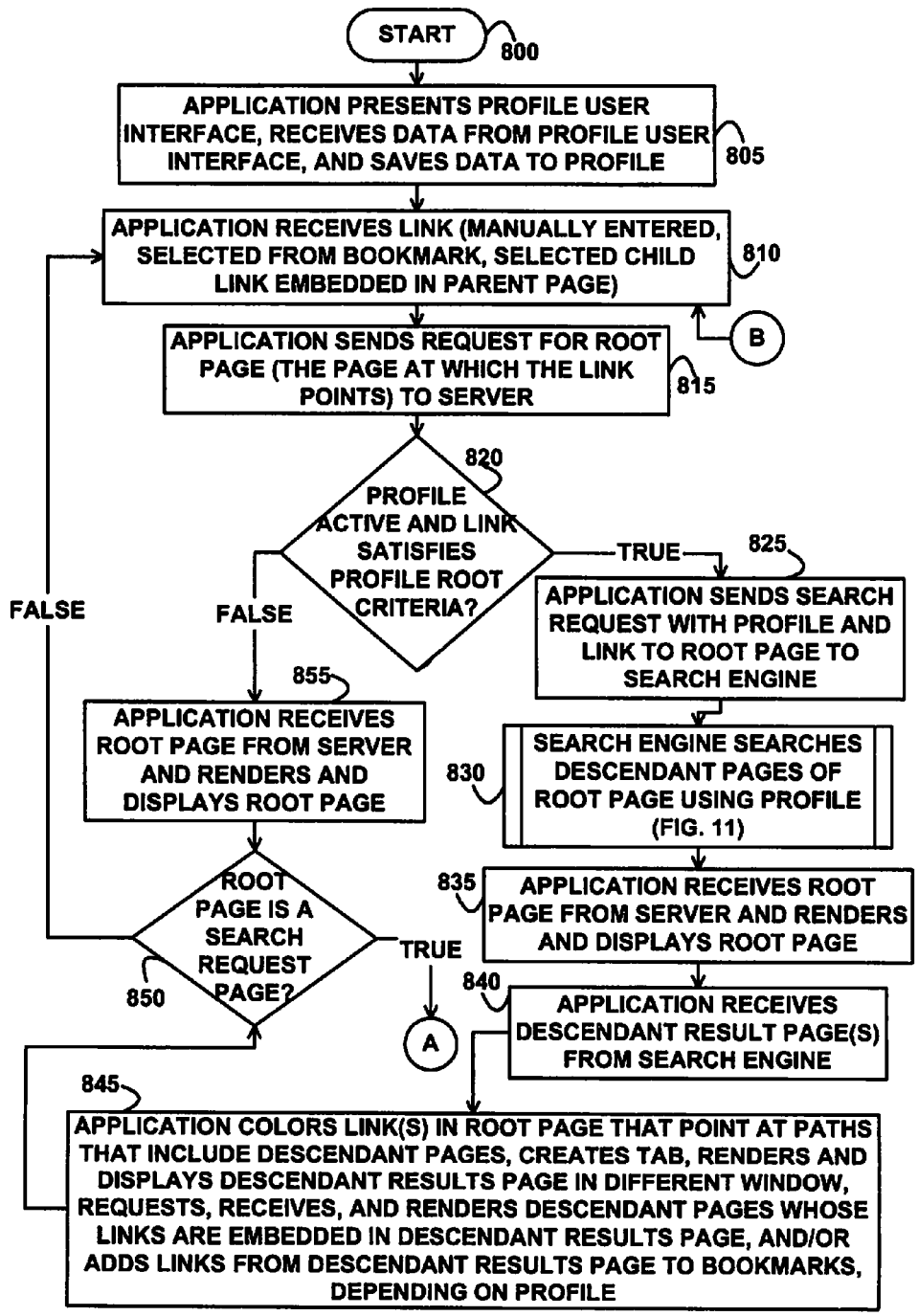
FIG. 8 depicts a flowchart of example processing for searching descendant pages of a root page using a profile, where the root page is found via a link, according to an embodiment of the invention.
Figure 9:
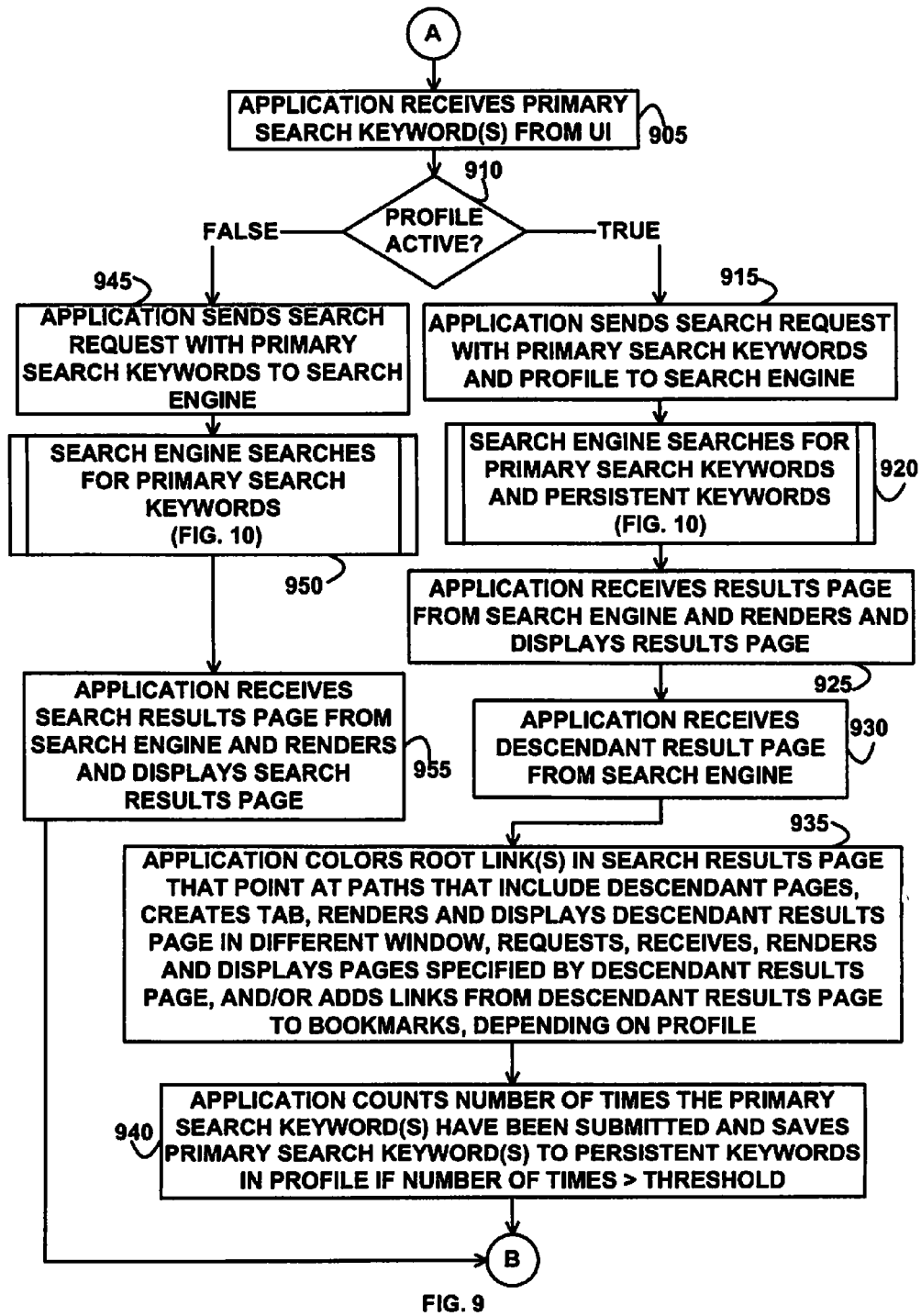
FIG. 9 depicts a flowchart of example processing for searching descendant pages of a root page using a profile, where the root page is found by a search, according to an embodiment of the invention.

FIGS. 8 and 9 depict flowcharts of example processing for searching descendant pages of a root page using a profile 152. In FIG. 8, the root page is retrieved via a link. In FIG. 9, the root page is found by a search, and the root page includes a term that matches a primary search keyword.

In FIG. 8, control begins at block 800. Control then continues to block 805 where the application 150 presents or displays the profile user interface 300 on the terminal 121, receives input data from the profile user interface 300, and saves the input data to the profile 152 that is named by the profile name 305. The input data may include the profile name 305, the persistent search keyword(s) 310, the depth 315, a specification of the root page options 320-1, 320-2, 320-3, or 320-4, and a specification of the options 325-1, 325-2, 325-3, 325-4, 325-5, 325-6, and/or 325-7.

Control then continues to block 810 where the application 150 receives a link to a root page and a request to retrieve the root page, e.g., via the user interface 500 and manual text input into the input field 515, via selection of a link from the bookmark 510, or via selection of a child link that is embedded in a parent page. The application 150 may also receive an optional profile name via the profile name field 520. Control then continues to block 815 where the application 150 sends a request to retrieve the root page that is pointed at by the link to the server computer system 135.

Control then continues to block 820 where the application 150 determines whether the profile 152 was received from the user interface 500 or is active for the retrieval of the root page and contains valid data. The application 150 further determines whether the received link satisfies the root page criteria 320 specified in the profile 152. That is, if the root page criteria 320-2 is specified in the received profile 152 named by the profile name 520, then the application 150 determines whether the received link was received via a selection of a bookmark 510; if the root page criteria 320-3 is specified in the received profile 152 named by the profile name 520, then the application 150 determines whether the received link was received from a selected embedded child link in a parent page; and if the root page criteria 320-4 is specified in the received profile 152, then the application 150 determines whether the received link was received from a manually entered address in the input field 515.

If the determination at block 820 is true, then the profile 152 was received or is active for the retrieval of the root page and contains valid data and the link satisfies the profile root criteria 320 specified in the profile 152 named by the profile name 520, so control continues to block 825 where the application 150 sends a search request with the profile 152 and the link that points at the root page to the search engine 190. In another embodiment, the application 150 sends selected data from the profile 152 (such as the persistent search keyword(s) 310 and the depth 315) and the link that points at the root page to the search engine 190. The search request instructs the search engine 190 to search descendant pages of the root page (pointed at by the link) for terms that match the persistent search keyword(s) 310, where the descendant pages are descendants of the root page and exist at levels on paths from the root page, and where the levels are within, up to, or less than or equal to the depth 315.

Control then continues to block 830 where the search engine 190 receives the search request with the profile 152 and link to a root page. In response to the request, the search engine 190 performs the search and sends the descendant results page 156 to the application 150, as further described below with reference to FIG. 11.

Control then continues to block 835 where the application 150 receives the root page from the server (previously requested at block 815, as previously described above) and renders (formats) and displays the root page via the terminal 121 (e.g., the root page 138-1 as illustrated in FIG. 5). Control then continues to block 840 where the application 150 receives the descendant results page 156 from the search engine 190. Control then continues to block 845 where the application 150 determines the options 325 that are specified in the profile 152 and performs the actions specified by the options 325.

If the application 150 determines that the auto open option 325-1 is specified in the profile 152, then the application 150 opens the descendant results page 156 in a different window from the search results page.

If the application 150 determines that the auto retrieve option 325-2 is specified in the profile 152, then the application 150 retrieves and displays the descendant pages 138-3 and 138-10 (which include terms that match the persistent search keyword(s) 310) via the descendant links 530-1 and 530-2 that are included in the descendant results page 156.

If the application 150 determines that the tab option 325-3 is specified in the profile 152, then the application 150 displays the tab 505, and in response to selection of the tab 505, the application 150 displays the descendant results page 156 that includes the descendant links 530-1 and 530-2 that point at the descendant pages 138-3 and 138-10 that the search engine 190 found that include terms that match the persistent search keyword(s) 310.

If the application 150 determines that the color option 325-4 is specified in the profile 152, then the application 150 highlights or displays with a specified color those links embedded in the root page 138-1 that point at paths that include the descendant pages 138-3 and 138-10 that the search engine 190 found that include terms 210-1 and 210-2 that match the persistent search keyword(s) 310. A link points at a path by pointing at a page that is in the path.

If the application 150 determines that the create bookmarks option 325-5 is specified in the profile 152, then the application 150 adds the links 530-1 and 530-2, which point at the respective descendant pages 138-3 and 138-10, to the bookmarks 510.

Control then continues to block 850 where the application 150 determines whether the received root page is a search request page that provides an interface for submitting searches to the search engine 190 (such as the search request page 154, previously described above with reference to FIG. 4).

If the determination at block 850 is false, then the received root page is not a search request page 154, so control returns to block 810 where the application 150 receives another link, as previously described above.

If the determination at block 850 is true, then the received root page is a search request page 154, so control continues to block 905 of FIG. 9 where the application 150 receives primary search keywords 415 from the user interface of the search page 154.

Control then continues to block 910 where the application 150 determines whether the profile 152 was received or is active for the search request (includes the root page criteria 320-1) and contains valid data. If the determination at block 910 is true, then the application received the profile 152 and the profile 152 is active for the retrieval of the root page and contains valid data, so control continues to block 915 where the application 150 sends a search request with the primary search keywords 415 and the profile 152 named by the profile name 420 to the search engine 190. In another embodiment, the application 150 sends selected data from the profile 152 (such as the persistent search keyword(s) 310 and the depth 315) to the search engine 190. The search request instructs the search engine 190 to search the descendant pages of root pages that include terms 635 that match the persistent search keyword(s) 310, where the descendant pages are descendants of the root page and exist at levels on paths from the root page, where the levels are within, up to, or less than or equal to the depth 315, and where the search engine 190 finds the root pages that include terms that match the primary search keywords.

Control then continues to block 920 where the search engine 190 receives the search request with the primary search keywords and the profile 152. In response to the request, the search engine 190 performs the search and sends the descendant results page 156 to the application 150, as further described below with reference to FIG. 10.

Control then continues to block 925 where the application 150 receives the search results page 158 from the search engine 190 and renders (formats) and displays the search results page 158 via the terminal 121, as previously described above with reference to FIG. 4). Control then continues to block 930 where the application 150 receives the descendant results page 156 from the search engine 190. Control then continues to block 935 where the application 150 determines the options 325 that are specified in the profile 152 and performs the actions specified by the options 325.

If the application 150 determines that the auto open option 325-1 is specified in the profile 152, then the application 150 opens and displays the descendant results page 156 in a different window from the search results page 158, as illustrated in FIG. 4.

If the application 150 determines that the auto retrieve option 325-2 is specified in the profile 152, then the application 150 retrieves and displays the descendant pages 138-3 and 138-10 (which include terms 210-1 and 210-2 that match the persistent search keyword(s) 310) via the descendant links 430-1 and 430-2 that are included in the descendant results page 156 (FIG. 4).

If the application 150 determines that the tab option 325-3 is specified in the profile 152, then the application 150 associated the descendant results page 156 with the tab 405 and displays the tab 405, and in response to selection of the tab 405, the application 150 displays the descendant results page 156 that includes the descendant links 430-1 and 430-2, which point at the descendant pages 138-3 and 138-10, which the search engine 190 found that include the terms 430-1 and 430-2, which match the persistent search keyword(s) 310.

If the application 150 determines that the color option 325-4 is specified in the profile 152, then the application 150 highlights or displays with a specified color those root links embedded in the search results page 158 that point at paths that include the descendant pages 138-3 and 138-10 that the search engine 190 found that include terms that match the persistent search keyword(s) 310. A link points at a path by pointing at a page that is in the path.

If the application 150 determines that the create bookmarks option 325-5 is specified in the profile 152, then the application 150 adds the links 430-1 and 430-2, which point at the respective descendant pages 138-3 and 138-10, to the bookmarks 510.

Control then continues to block 940 where the application 150 counts the number of times that the primary search keywords 415 were submitted by the user with a search request and searched by the search engine 190. The application 150 further determines whether the number of times is greater than the threshold 325-7. If the number of times that the primary search keywords 415 have been submitted to the search engine 190 for a search is greater than the threshold 325-7, then the application 150 adds the primary search keywords 415 to the persistent search keyword(s) 310 in the profile 152, so that the next time the profile 152 is used to search for descendant pages, the search engine 190 searches for the persistent search keyword(s) 310, some of which were primary keywords 415 used on previous searches.

Control then returns to block 810 (FIG. 8) where the application 150 receives another link, as previously described above.

If the determination at block 910 is false, then a profile 152 is not active, does not include the root criteria 320-1, or a profile is not received for the search request, so control continues to block 945 where the application 150 sends the search request with the primary search keywords 415 to the search engine 190. Control then continues to block 950 where the search engine 190 searches for the primary search keywords 415, as further described below with reference to FIG. 10. Control then continues to block 955 where the application 150 receives the search results page 158 from the search engine 190 and renders and displays the search results page 158. Control then returns to block 810 (FIG. 8) where the application 150 receives another link, as previously described above.

Referring again to FIG. 8, if the determination at block 820 is false, then the profile 152 was not received, the link does not satisfy the root criteria 320, or is not active, so control continues to block 855 where the application 150 receives the root page from the server and renders and displays the root page. Control then continues to block 850, as previously described above.

Figure 10:
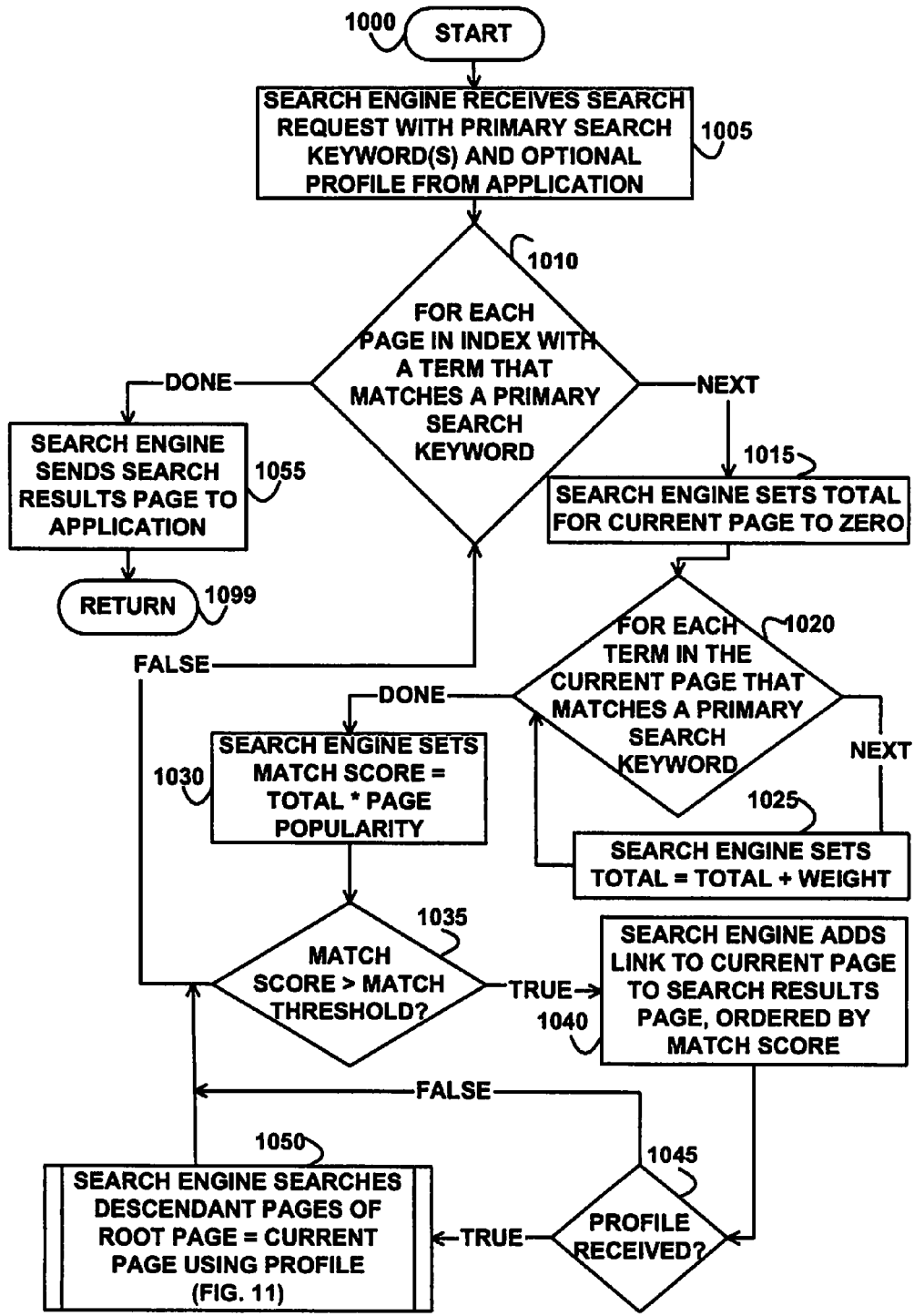
FIG. 10 depicts a flowchart of example processing for searching pages using a profile, according to an embodiment of the invention.

FIG. 10 depicts a flowchart of example processing for searching for pages using a profile, according to an embodiment of the invention. Control begins at block 1000. Control then continues to block 1005 where the application 150 receives a search request with primary search keywords 415 and an optional profile 152 that includes persistent search keyword(s) 310 and a depth 315 from the application 150.

Control then continues to block 1010 where the search engine 190 starts a loop that executes once for each page in the index 192 that includes a term 635 that matches (is the same as) a primary search keyword 415. So long as the determination at block 1010 is true, then a current page exists that has not yet been processed by the loop that starts at block 1005 and the current page contains a term 635 that matches a primary search keyword 415, so control continues to block 1015 where the search engine 190 sets a total for the current page to zero.

Control then continues to block 1020 where the search engine 190 enters a loop that executes once for each term 635 in the current page that matches a primary search keyword 415. So long as the current page includes a current term 635 that matches a primary search keyword 415 and the current term 635 has not yet been processed by the loop that starts at block 1020, control continues to block 1025 where the search engine 190 sets the current page total to be the current page total plus the weight 640 in the index 192 that is assigned to the current term 635 in the current page. Control then returns to block 1020 where the search engine 190 sets the current matching term 635 to be the next matching term 635 in the current page and determines whether all matching terms 635 in the current page have been processed by the loop that starts at block 1020.

Once all matching terms 635 for the current page have been processed, then the loop that starts at block 1020 is done, so control continues from block 1020 to block 1030 where the search engine 190 sets the match score for the current page to be the current page total that was calculated by the loop that started at block 1020 multiplied by the page popularity 625 of the current page. The current page match score thus indicates, in an embodiment, the relative degree to which the current page includes terms 635 that match the primary search keywords 415, the relative degree to which the terms 635 in the current page are important within the current page, and/or the relative degree to which the current page is popular or important as compared to other pages that are described by the index 192.

Control then continues to block 1035 where the search engine 190 determines whether the current page match score is greater than a match threshold value. In an embodiment, the match threshold value is zero, meaning that a page containing even one term that matches the primary search keyword 415 is relevant, regardless of the location of the term within the current page and regardless of the unpopularity of the current page. In other embodiments, the match threshold may be fixed or variable. For example, in an embodiment, the search engine 190 changes the match threshold in proportion to the number of descendant pages of the root page are found, in proportion to the number of descendant pages of the root page that include a term that matches the keyword are found, in proportion to the number of child links in the root page, in proportion to the number of paths from each, some, or all of the child links, or based on any other appropriate criteria. The search engine 190 may change the match threshold, in order to adjust the number of relevant paths and direct descendant links to a level that is manageable and useful for the user.

If the determination at block 1035 is true, then the current page match score is greater than a match threshold value, so control continues from block 1035 to block 1040 where the search engine 190 adds the link that points at the current page to the search results page 158, ordered by the match scores of the links in the search results page 158. Control then continues to block 1045 where the search engine 190 determines whether the profile 152 was received. If the determination at block 1045 is true, then the profile 152 was received, so control continues to block 1050 where the search engine 190 searches descendant pages of the root page (the current page) on paths up to the depth 315 for terms that match the persistent search keywords 310 using the profile 152, as further described below with reference to FIG. 11. Control then returns to block 1010 where the search engine 190 sets the current page to be the next page that includes a term 635 that matches a primary search keyword 415, as previously described above.

If the determination at block 1035 is false, then the current page match score is not greater than the match threshold, so control returns from block 1035 to block 1010, as previously described above.

If the determination at block 1045 is false, then the profile 152 was not received, so control returns to block 1010, as previously described above.

When all pages that are described in the index 192 and that include a term 635 that matches a primary search keyword 415 have been processed by the loop that starts at block 1010, then the loop is done, so control continues from block 1010 to block 1055 where the search engine 190 sends the search results page 158 to the application 150. Control then continues to block 1055 where the logic of FIG. 10 returns.

Figure 11:
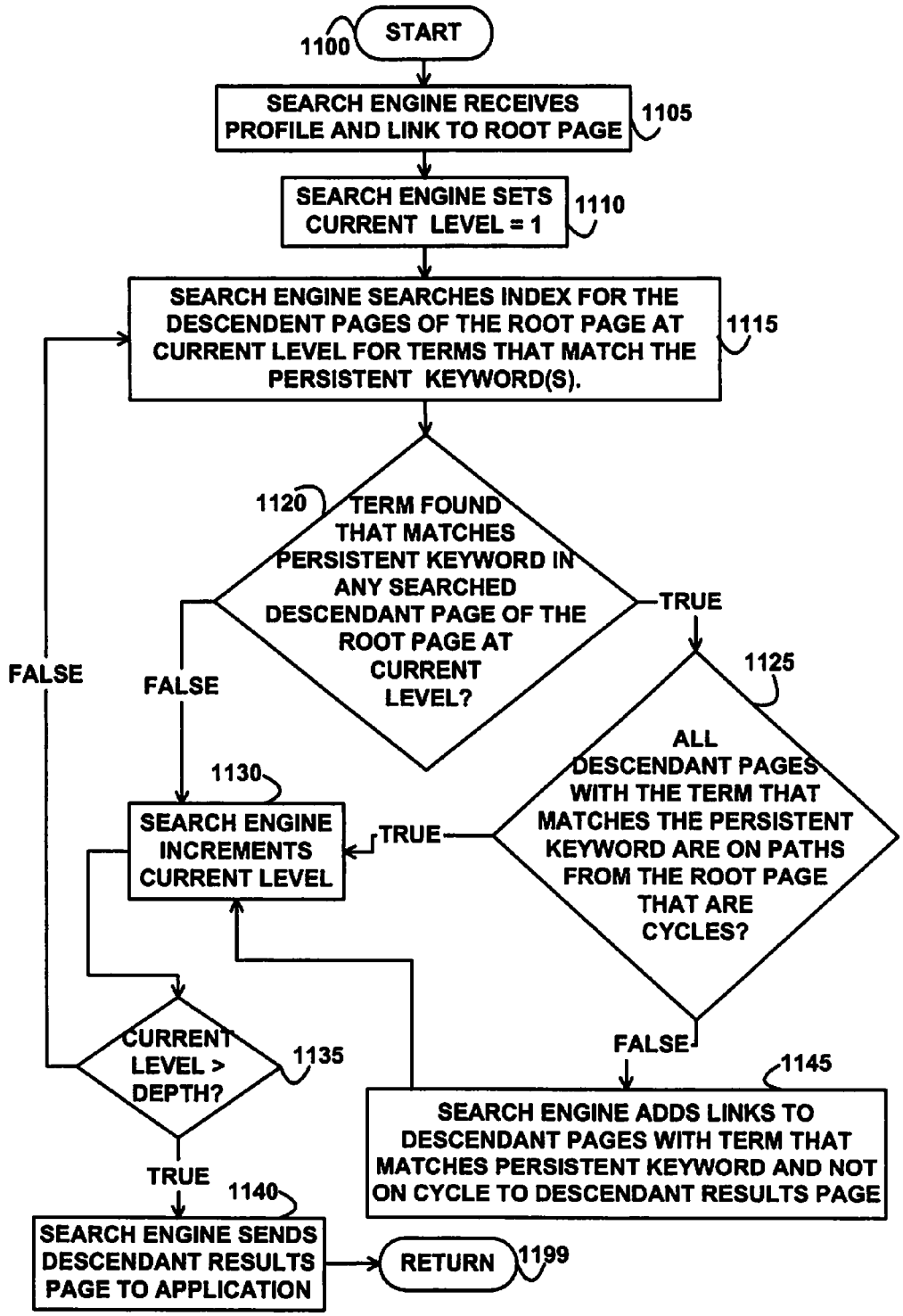
FIG. 11 depicts a flowchart of example processing for searching descendant pages using a profile, according to an embodiment of the invention.

FIG. 11 depicts a flowchart of example processing for searching descendant pages of a root page using a profile 152, according to an embodiment of the invention. Control begins at block 1100. Control then continues to block 1105 where the search engine 190 receives the profile 152 (or selected data from the profile 152) and a link to a root page. In an embodiment, the search engine 190 receives the profile 152 and the link from the application 150, which the application 150 sent as previously described above with reference to block 825 of FIG. 8. In another embodiment, the search engine 190 receives the profile 152 and the link internally from the search engine logic, as previously described above with reference to block 1050 of FIG. 10.

Control then continues to block 1110 where the search engine 190 sets the current level to be one, representing the first level from the root page, which is pointed at by the received link to the root page. In an embodiment, the current level is the level at which the search engine 190 is currently searching along paths from the root page, but in other embodiments any appropriate search technique and level tracking mechanism may be used. Control then continues to block 1115 where the logic of FIG. 11 enters a loop that executes once for each level away from the root page, up to the depth 315 (the maximum level to be searched). At block 1115, the search engine 190 searches the index 192 for the descendant pages of the root page that are located at the current level (on paths from the root page) for terms that match the persistent search keyword(s) 310.

If the current level is equal to one, then the search engine 190 finds the child links in the root page and then finds the addresses 605 in the index 192 that match the child links. The terms 635 in the index 192 that are associated with the found addresses 605 that match the child links of the root page are the terms 635 in the child page, so they are the terms in the descendant pages at level one from the root page. If the current level is greater than one, then the search engine 190 follows the outgoing links 645 associated with the root page's address 605, in order to find the descendant pages in the index 192 at level two. The search engine 190 repeats this process in order to find descendant pages at additional levels.

Control then continues to block 1120 where the search engine 190 determines whether any persistent search keyword 310 is found as a term 635 in any descendant page of the root page at the current level by determining if any term 635 in the index 192 associated with an address 605 of a descendant page is the same as (matches) the persistent search keyword 310.

If the determination at block 1120 is true, then a page that is described in the index 192 and exists at the current level (on a path from the root page) contains a term 635 that matches (is equal to) one of the received persistent search keyword(s) 310, so control continues to block 1125 where the search engine 190 determines whether all descendant pages at the current level that contain a term 635 that matches the persistent search keyword 310 are on paths from the root page that are cycles.

If the determination at block 1125 is true, then all descendant pages at the current level that contain a term 635 that matches the persistent search keyword 310 are on paths from the root page that are cycles, so control continues to block 1130 where the search engine 190 increments the current level by one. Control then continues to block 1135 where the search engine 190 determines whether the current level is greater than the depth 315 (the maximum level away from the root page at which the search engine 190 is to search).

If the determination at block 1135 is true, then the current level is greater than the depth 315, so all levels that are within the depth 315 away from the root page have been searched by the logic of FIG. 11. Thus, no more pages need to be searched, and the search engine 190 stops searching the pages.

Control then continues to block 1140 where the search engine 190 sends the descendant results page 156 to the application 150. Control then continues to block 1199 where the logic of FIG. 11 returns.

If the determination at block 1135 is false, then the current level is not greater than the depth 315 and more levels within the depth 315 from the root page remain to be searched, so control returns to block 1115 where the search engine 190 continues the search at the new current level, as previously described above.

If the determination at block 1125 is false, then at least one descendant page at the current level exists that includes a term 635 that matches the persistent search keyword 310, and the at least one descendant page exists on a path (e.g., the path 205) from the root page that is not a cycle, so control continues to block 1145 where the search engine 190 adds descendant links 430-1 and 430-2 that point at the found descendant pages (that contain the term 210-1 or 210-2 that matches the persistent search keyword 310 and are on paths that are not cycles) to the descendant results page 156. Control then continues to block 1130 where the search engine increments the current level, as previously described above.

If the determination at block 1120 is false, then all pages that are described in the index 192 as existing at the current level from the root page along a path do not include terms 635 that match the persistent search keyword(s) 310, so control continues to block 1130 where the search engine 190 increments the current level to the next level, as previously described above.

Although various functions of embodiments of the invention have been described above as being implemented by a search engine 190 at a server computer system 132 and by the application 150 at the client computer system 100, in other embodiments the functions of the invention described as being implemented in the application 150 may be implemented in the search engine 190, and vice versa. Thus, in various embodiments, the requester (that provides links to root pages, requests searches, and provides primary and persistent search keyword(s) and other data) may either be a user that selects interface elements, inputs data, and views a user interface 300, 400, or 500, or the requester may be the application 150 that sends data to the search engine 190.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A computer-implemented method comprising:

receiving a request from a requestor, wherein the request comprises a primary keyword and a profile, wherein the profile comprises at least one persistent keyword;

in response to the request, finding a plurality of root pages, wherein the plurality of root pages comprise first terms that match the primary keyword;

determining whether a plurality of root links that point at the plurality of root pages satisfies a root criteria in the profile, wherein the root criteria is selected from the plurality of root pages match the primary keyword, the plurality of root pages are retrieved from a bookmarked address, the plurality of root pages are retrieved from an embedded child link in a parent page, and the plurality of root pages are retrieved from a manually entered address;

if the plurality of root links that point at the plurality of root pages do not satisfy the root criteria, displaying the plurality of root pages;

if the plurality of root links that point at the plurality of root pages do satisfy the root criteria, in response to the request, searching a plurality of descendant pages that are descendants of the plurality of root pages;

if the plurality of root links that point at the plurality of root pages do satisfy the root criteria, determining that a first descendant page among the plurality of descendant pages comprises a second term that matches the persistent keyword;

if the plurality of root links that point at the plurality of root pages do satisfy the root criteria, counting a number of times the primary keyword has been received from the requestor;

if the plurality of root links that point at the plurality of root pages do satisfy the root criteria and if the number of times is greater than a threshold number, adding the primary keyword to the at least one persistent keyword in the profile to create a plurality of persistent keywords;

if the plurality of root links that point at the plurality of root pages do satisfy the root criteria, searching descendant pages of another root page for terms that match the plurality of persistent keywords;

searching the plurality of descendant pages of the plurality of root pages for the second term that matches the persistent keyword, wherein the searching further comprises determining that the plurality of descendant pages are at a plurality of levels on a plurality of paths from the plurality of root pages and determining that the plurality of levels are within a depth from the plurality of root pages, wherein the profile further comprises the depth, wherein the searching the plurality of descendant pages of the plurality of root pages for the second term further comprises determining that a path that includes the first descendant page is not a cycle, wherein the cycle comprises a closed walk that comprises an alternating sequence of a subset of nodes and edges of a graph, beginning with a first-node and ending with a last-node, wherein the first-node and the last-node are a same node;

sending the plurality of root links that point at the plurality of root pages to the requestor;

sending a first descendant link that points at the first descendant page to the requestor;

displaying the plurality of root links;

displaying a tab;

in response to a selection of the tab, retrieving the first descendant page via the first descendant link;

displaying the plurality of root links; and coloring the root link that points at a path that includes the first descendant page.

2. A storage medium encoded with instructions, wherein the instructions when executed comprise:

receiving a request from a requestor, wherein the request comprises a primary keyword and a profile, wherein the profile comprises at least one persistent keyword;

in response to the request, finding a plurality of root pages, wherein the plurality of root pages comprise first terms that match the primary keyword;

determining whether a plurality of root links that point at the plurality of root pages satisfies a root criteria in the profile, wherein the root criteria is selected from the plurality of root pages match the primary keyword, the plurality of root pages are retrieved from a bookmarked address, the plurality of root pages are retrieved from an embedded child link in a parent page, and the plurality of root pages are retrieved from a manually entered address;

if the plurality of root links that point at the plurality of root pages do not satisfy the root criteria, displaying the plurality of root pages;

if the plurality of root links that point at the plurality of root pages do satisfy the root criteria, in response to the request, searching a plurality of descendant pages that are descendants of the plurality of root pages;

if the plurality of root links that point at the plurality of root pages do satisfy the root criteria, determining that a first descendant page among the plurality of descendant pages comprises a second term that matches the persistent keyword;

if the plurality of root links that point at the plurality of root pages do satisfy the root criteria, counting a number of times the primary keyword has been received from the requestor;

if the plurality of root links that point at the plurality of root pages do satisfy the root criteria and if the number of times is greater than a threshold number, adding the primary keyword to the at least one persistent keyword in the profile to create a plurality of persistent keywords;

if the plurality of root links that point at the plurality of root pages do satisfy the root criteria, searching descendant pages of another root page for terms that match the plurality of persistent keywords;

searching the plurality of descendant pages of the plurality of root pages for the second term that matches the persistent keyword, wherein the searching further comprises determining that the plurality of descendant pages are at a plurality of levels on a plurality of paths from the plurality of root pages and determining that the plurality of levels are within a depth from the plurality of root pages, wherein the profile further comprises the depth, wherein the searching the plurality of descendant pages of the plurality of root pages for the second term further comprises determining that a path that includes the first descendant page is not a cycle, wherein the cycle comprises a closed walk that comprises an alternating sequence of a subset of nodes and edges of a graph, beginning with a first-node and ending with a last-node, wherein the first-node and the last-node are a same node;

sending the plurality of root links that point at the plurality of root pages to the requestor;

sending a first descendant link that points at the first descendant page to the requestor;

displaying the plurality of root links;

displaying a tab;

in response to a selection of the tab, retrieving the first descendant page via the first descendant link;
displaying the plurality of root links; and
coloring the root link that points at a path that includes the first descendant page.

3. A computer system comprising:
a processor; and
memory connected to the processor, wherein the memory encodes instructions that when executed by the processor comprise:
receiving a request from a requestor, wherein the request comprises a primary keyword and a profile, wherein the profile comprises at least one persistent keyword,
in response to the request, finding a plurality of root pages, wherein the plurality of root pages comprise first terms that match the primary keyword,
determining whether a plurality of root links that point at the plurality of root pages satisfies a root criteria in the profile, wherein the root criteria is selected from the plurality of root pages match the primary keyword, the plurality of root pages are retrieved from a bookmarked address, the plurality of root pages are retrieved from an embedded child link in a parent page, and the plurality of root pages are retrieved from a manually entered address,
if the plurality of root links that point at the plurality of root pages do not satisfy the root criteria, displaying the plurality of root pages,
if the plurality of root links that point at the plurality of root pages do satisfy the root criteria, in response to the request, searching a plurality of descendant pages that are descendants of the plurality of root pages,
if the plurality of root links that point at the plurality of root pages do satisfy the root criteria, determining that a first descendant page among the plurality of descendant pages comprises a second term that matches the persistent keyword,
if the plurality of root links that point at the plurality of root pages do satisfy the root criteria, counting a number of times the primary keyword has been received from the requestor,
if the plurality of root links that point at the plurality of root pages do satisfy the root criteria and if the number of times is greater than a threshold number, adding the primary keyword to the at least one persistent keyword in the profile to create a plurality of persistent keywords,
if the plurality of root links that point at the plurality of root pages do satisfy the root criteria, searching descendant pages of another root page for terms that match the plurality of persistent keywords,
searching the plurality of descendant pages of the plurality of root pages for the second term that matches the persistent keyword, wherein the searching further comprises determining that the plurality of descendant pages are at a plurality of levels on a plurality of paths from the plurality of root pages and determining that the plurality of levels are within a depth from the plurality of root pages, wherein the profile further comprises the depth, wherein the searching the plurality of descendant pages of the plurality of root pages for the second term further comprises determining that a path that includes the first descendant page is not a cycle, wherein the cycle comprises a closed walk that comprises an alternating sequence of a subset of nodes and edges of a graph, beginning with a first-node and ending with a last-node, wherein the first-node and the last-node are a same node,
sending the plurality of root links that point at the plurality of root pages to the requestor,
sending a first descendant link that points at the first descendant page to the requestor,
displaying the plurality of root links,
displaying a tab,
in response to a selection of the tab, retrieving the first descendant page via the first descendant link,
displaying the plurality of root links, and
coloring the root link that points at a path that includes the first descendant page.

* * * * *